United States Patent
Yamazaki et al.

(10) Patent No.: US 6,326,225 B1
(45) Date of Patent: Dec. 4, 2001

(54) METHOD OF MANUFACTURING LIQUID CRYSTAL DEVICE

(75) Inventors: Shunpei Yamazaki, Tokyo; Takeshi Nishi, Kanagawa, both of (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/470,102

(22) Filed: Dec. 21, 1999

Related U.S. Application Data (63) Continuation of application No. 08/821,101, filed on Mar. 20, 1997, now Pat. No. 6,099,672.

(30) Foreign Application Priority Data

Mar. 23, 1996 (JP) .......................................... 8-93368

(51) Int. Cl.[7] .............................. H01L 21/00; B65B 1/20; G02F 1/1335; G02F 1/1339
(52) U.S. Cl. ................................. 438/30; 359/62; 359/80; 141/70
(58) Field of Search ................................. 438/30; 359/62, 359/80, 153, 154, 189; 141/70

(56) References Cited

U.S. PATENT DOCUMENTS

| | | | |
|---|---|---|---|
| 4,094,058 | * | 6/1978 | Yasutake et al. ................. 349/189 X |
| 4,526,818 | * | 7/1985 | Hoshikawa et al. ............. 156/106 X |
| 4,548,475 | * | 10/1985 | Brendle et al. .................... 349/189 X |
| 5,080,146 | * | 1/1992 | Arasteh ............................. 156/109 X |
| 5,359,442 | * | 10/1994 | Tanaka et al. ........................... 359/62 |
| 5,454,893 | * | 10/1995 | Dietz ................................. 156/109 X |
| 5,459,597 | * | 10/1995 | Yamamoto et al. .................... 359/80 |
| 5,492,582 | * | 2/1996 | Ide et al. ............................... 156/106 |
| 5,517,344 | * | 5/1996 | Hu et al. ................................... 359/8 |
| 5,706,069 | * | 1/1998 | Hermens et al. ................. 349/189 X |
| 5,725,032 | * | 3/1998 | Oshima et al. ......................... 141/70 |
| 5,764,320 | * | 6/1998 | Konuma et al. ........................ 349/40 |
| 5,815,231 | | 9/1998 | Nishi et al. . |
| 5,943,107 | * | 8/1999 | Kadota et al. ......................... 349/44 |
| 5,995,189 | * | 11/1999 | Zhang ................................. 349/153 |
| 6,011,607 | * | 1/2000 | Yamazaki et al. .................... 349/153 |

FOREIGN PATENT DOCUMENTS

| | | |
|---|---|---|
| 6-244103 | 9/1994 | (JP) . |
| 6-244104 | 9/1994 | (JP) . |
| 407092475-A | * 4/1995 | (JP) . |
| 7-92475 | * 4/1995 | (JP) . |

\* cited by examiner

*Primary Examiner*—John F. Niebling
*Assistant Examiner*—Viktor Simkovic
(74) *Attorney, Agent, or Firm*—Fish & Richardson P.C.

(57) ABSTRACT

A multiple panel is manufactured having individual panels in each of which a sealing material surrounds a pixel region and peripheral driver circuit regions. At least a part of the sealing material in the respective panels is provided with seal openings to enable a liquid crystal material to be injected into the inside of the sealing material. A single or a plurality of injection holes leading to the seal openings to permit the liquid crystal material to pass are formed on a side among the peripheral portion of the multiple panel. Vacuum injection method is carried out in a vacuum chamber, and the liquid crystal material is injected into the inside of the sealing material of the respective panels over the pixel regions and the peripheral driver circuit regions from the injection hole through the seal openings of the respective panels. Thereafter, the multiple panel is separated into individual panels.

33 Claims, 4 Drawing Sheets

DRIVER CIRCUIT TFT | PIXEL TFT

FIG. 5
*(Prior Art)*

METHOD OF MANUFACTURING LIQUID CRYSTAL DEVICE

This application is a continuation of Ser. No. 08/821,101 filed Mar. 20, 1997 now U.S. Pat. No. 6,099,672.

BACKGROUND OF THE INVENTION

1. Field of the Invention

The present invention relates to technology for improving the productivity of an active matrix liquid crystal device. The present invention relates to technology of injecting a liquid crystal material into a panel forming a liquid crystal device.

2. Description of the Related Art

Generally, when an active matrix liquid crystal device is manufactured, the process of injecting a liquid crystal material into a panel forming the liquid crystal device utilizes vacuum injection. Vacuum injection is a method of injecting a liquid crystal material utilizing capillarity and difference in pressure. A general method of filling a panel with a liquid crystal material according to vacuum injection is described as follows.

It is to be noted that, in the present specification, an element substrate means a substrate provided with an active matrix circuit and peripheral driver circuits thereon. A counter substrate means a substrate which is provided so as to face an element substrate and on which counter electrodes, a color filter, and so on are formed.

Figure 5:
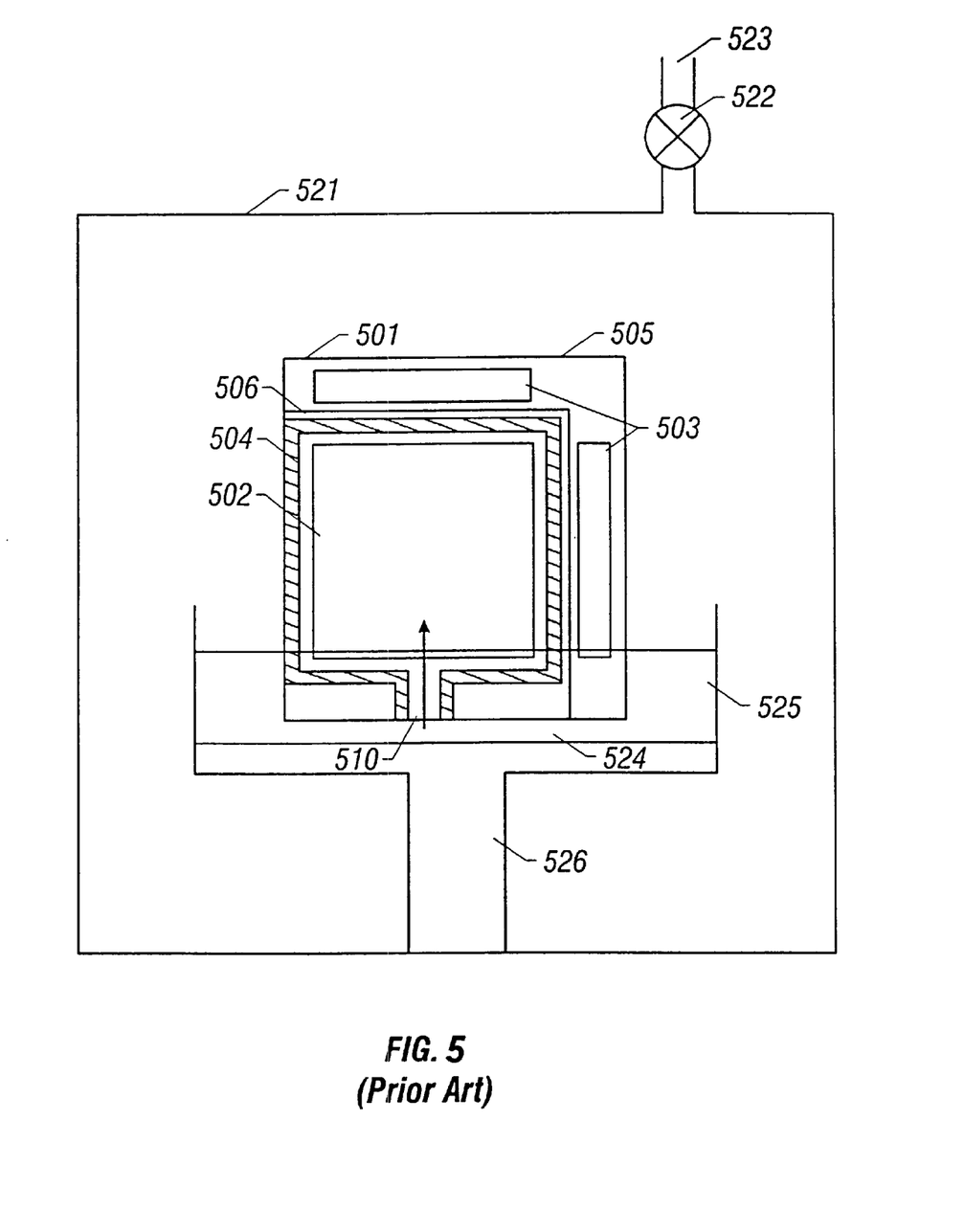
FIG. 5 shows a conventional process of injecting a liquid crystal material.

FIG. 5 shows a conventional process of injecting a liquid crystal material. In FIG. 5, an element substrate 505 and a counter substrate 506 of a panel 501 are provided so as to face each other interposed a sealing material 504 therebetween.

The element substrate 505 has a pixel region 502 of an active matrix structure and peripheral driver circuit regions 503 provided with a circuit for driving the pixel region. The peripheral driver circuits provided on the element substrate 505 may be directly formed on a glass substrate, or, alternatively, may be formed by sticking an IC chip later.

On the other hand, the counter substrate 506 is provided with color filters and counter electrodes both of which face the pixel region 502 but are not shown.

Except for an injection hole 510 for the liquid crystal material, the sealing material 504 is provided so as to surround the pixel region 502. Here, the size of the counter substrate 506 is large enough to cover the region where the sealing material 504 is provided. The sealing material 504 is provided between the pixel region 502 and the peripheral driver circuit regions 503. The peripheral driver circuit regions 503 are provided outside the region occupied by the counter substrate 506.

A single or a plurality of the injection holes 510 for the liquid crystal material are provided on a side among the peripheral portion of the panel 501 where the end faces of the pair of substrates 505 and 506 are aligned.

The panel 501 is arranged inside a vacuum chamber 521. In FIG. 5, the panel 501 is supported by a holder which is not shown. Here, the panel 501 is perpendicularly disposed so that the injection hole 510 comes to the bottom.

In order to improve the productivity, batch processing is often carried out with a plurality of panels being disposed inside the vacuum chamber at a time.

The vacuum chamber 521 has an evacuation pipe 523 connected therewith through a valve 522. The evacuation pipe 523 is connected with a vacuum pump which is not shown to enable the pressure inside the vacuum chamber 521 to be reduced.

Further, a liquid crystal vessel 525 containing a liquid crystal material 524 is disposed on a stage 526. The stage 526 is vertically movable.

After the panel 501 is disposed, the air inside the vacuum chamber 521 is evacuated from the evacuation pipe 523 so that the pressure inside the vacuum chamber 521 is reduced to be on the order of $1 \times 10^{-5}$ Torr.

Next, the stage 526 is moved up to soak the injection hole 510 in the liquid crystal material 524 in the liquid crystal vessel 525. Here, both of the liquid crystal vessel 525 and the panel 501 are often heated to enhance the flowability of the liquid crystal material 524.

With the above state being maintained, by gradually raising the pressure inside the vacuum chamber 521, due to the difference in pressure and capillarity, the liquid crystal material 524 is injected into the panel 501 as shown by an arrow in FIG. 5.

Next, the valve 522 is released to terminate the state of the reduced pressure, and the panel 501 with the liquid crystal material 524 injected therein is taken out from the vacuum chamber 521.

Thereafter, both sides of the panel are pressurized to extrude excess liquid crystal, and, with the state maintained, ultraviolet curing or heat curing resin for sealing is applied to the injection hole 510, and then, the pressurization is removed. Then, the resin for sealing comes a little in the inside of the injection hole. With the state maintained, the resin for sealing is cured to seal the injection hole 510. In this way, the process of injecting the liquid crystal material is completed.

With the process of injecting the liquid crystal material according to vacuum injection, with respect to every panel or every batch, the processes of carrying the panel into the vacuum chamber, reducing the pressure, injecting the liquid crystal material, terminating the state of the reduced pressure, and taking out the panel are required to be repeated.

Among these processes, the injection of the liquid crystal material often takes an hour to more than several hours, even with respect to a panel having a diagonal on the order of 10 inches long thereof.

Particularly, recently, as a method of manufacturing a liquid crystal device of high productivity, a method referred to as "multiple" has become the mainstream. This is a method in which plural sets of a pixel region and peripheral driver circuit region that constitute one panel are formed on one substrate, a large panel (multiple panel) is formed by sticking a counter substrate with a sealing material, and thereafter, the large panel is separated into individual panels.

However, even in this method, injection of the liquid crystal material into the panel is conducted after separating the large panel into individual panels. Thus, when the liquid crystal material is injected into the respective panels, for example, in case four panels are taken (from one multiple panel, four panels each of which constitutes a liquid crystal device are to be obtained), the multiple panel is separated into four panels, and, injection of the liquid crystal is carried out separately with respect to the respective panels, and thus, the process of injecting is required to be repeated four times, which prevents the time necessary for the manufacturing process from being shortened.

Therefore, in order to improve the productivity of a liquid crystal device, the time necessary for the process of injecting the liquid crystal material is required to be shortened.

SUMMARY OF THE INVENTION

Accordingly, an object of the present invention is to shorten the time necessary for the process of injecting a liquid crystal material when manufacturing a liquid crystal device, to thereby improve the productivity of a liquid crystal device.

Figure 1:
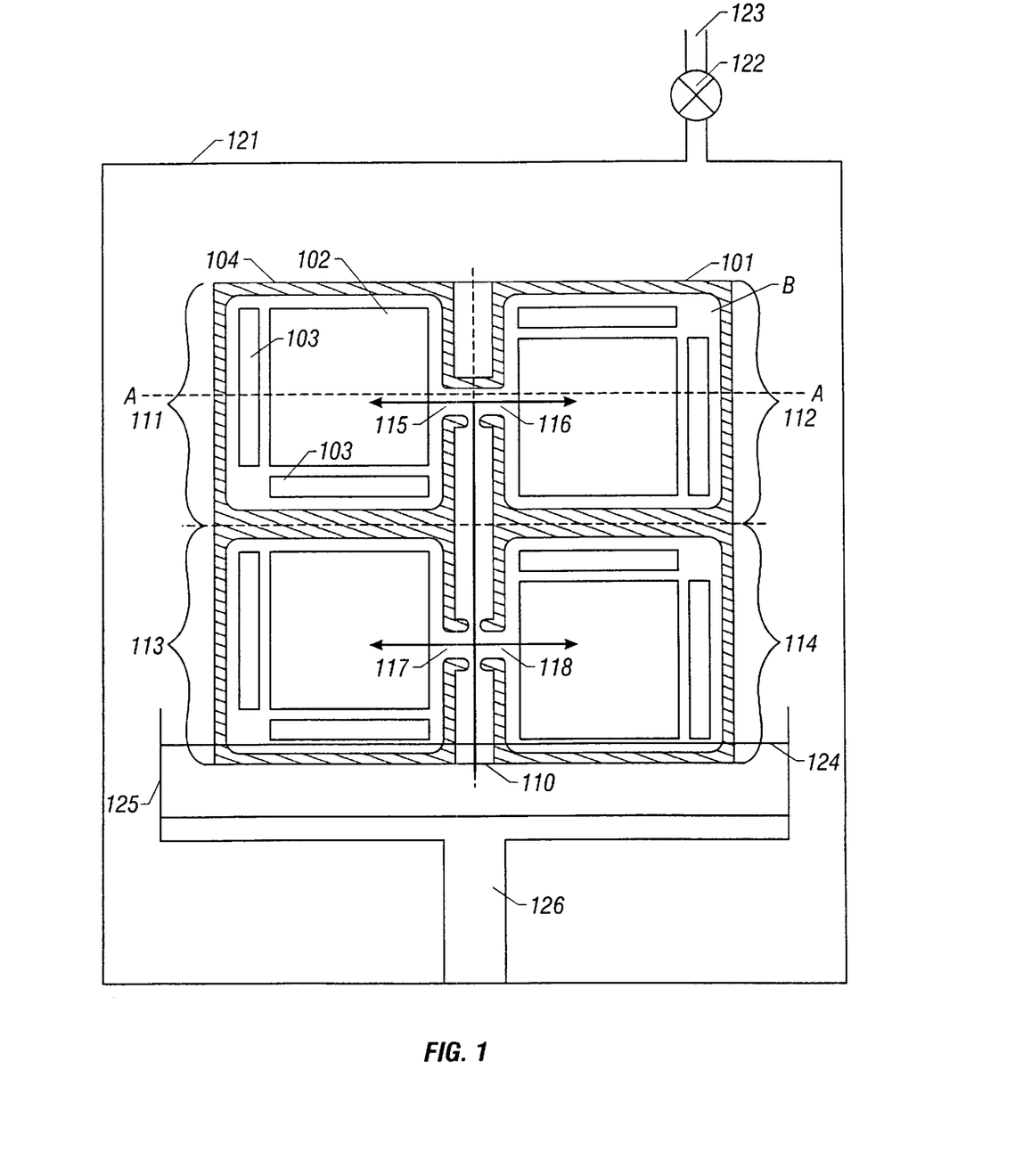
FIG. 1 shows a process of injecting a liquid crystal material according to the present invention.

According to one aspect of the invention, as shown in FIG. 1 as an embodiment thereof, there is provided a method of manufacturing a liquid crystal device comprising a process of injecting liquid crystal between a pair of substrates for forming a plurality of liquid crystal panels simultaneously, characterized in that a common injection hole 110 for injecting liquid crystal between the pair of substrates is commonly formed with respect to a plurality of liquid crystal panels 111–114, and by injecting liquid crystal between the pair of substrates from the injection hole 110, liquid crystal is injected into the plurality of liquid crystal panels 111–114 from seal openings 115–118 formed in the respective liquid crystal panel portions.

According to another aspect of the present invention, there is provided a method of manufacturing a liquid crystal device, characterized by comprising: using a multiple panel including an element substrate and a counter substrate formed thereon so as to face each other via a sealing material, plural sets of a pixel region and peripheral driver circuit region constituting one panel are formed on the element substrate, the sealing material so as to surround the pixel region and the peripheral driver circuit regions except for an opening with respect to every region constituting one panel, and at least two of the openings formed so as to lead to a single or a plurality of injection holes formed at a peripheral portion of the counter substrate and the element substrate; injecting by a vacuum injection method a liquid crystal material to the pixel region and the peripheral driver circuit regions surrounded by the sealing material from the injection hole of the multiple panel through the openings; and separating the multiple panel into individual panels.

According to the present invention, a liquid crystal material can be injected into the respective regions constituting a plurality of panels in a multiple panel in one injecting process.

DETAILED DESCRIPTION OF THE PREFERRED EMBODIMENTS

The present invention will be hereinafter described with reference to FIG. 1. FIG. 1 shows an example of a process of injecting a liquid crystal according to the present invention.

According to the present invention, first, a multiple panel 101 is formed as follows. Individual panels 111–114 are formed so that a sealing material 104 surrounds a pixel region 102 and peripheral driver circuit regions 103. At least a part of the sealing material of the respective panels is provided with seal openings 115–118 to enable a liquid crystal material 124 to be injected into the inside of the sealing material.

The multiple panel 101 has a plurality of panels having a such structure. A single or a plurality of injection holes 110 are provided on a side among the peripheral portion of the multiple panel 101. At this time, the injection hole 110 and the seal openings 115–118 lead to each other to permit the liquid crystal material to pass.

Vacuum injection is carried out with respect to the multiple panel 101 in a vacuum chamber 121, and the liquid crystal material 124 is injected into the inside of the sealing material of the respective panels over the pixel regions 102 and the peripheral driver circuit regions 103 from the injection hole 110 through the seal openings 115–118 of the respective panels. In this way, the liquid crystal is injected into a plurality of panels by one process of injecting liquid crystal.

Thereafter, the multiple panel is separated into individual panels, resin for sealing is applied to the respective seal openings or the adjacent portion, and the resin is cured to seal the liquid crystal material.

Further, since the area of a multiple panel is quite large, there is a possibility that, in the process of vacuum injection, when the liquid crystal material is injected, a region where the liquid crystal material is not injected (an unfilled region) appears in a corner portion of the sealing material 104.

Therefore, as shown in FIG. 1 as B, a corner portion on the side of the region where the pixel region 102 and the peripheral driver circuit regions 103 are formed may have a predetermined size of a radius of curvature.

This radius of curvature prevents a region, in particular, a corner region, from not being injected by the liquid crystal material, which is called an unfilled region, in a later process.

The radius of curvature R is preferably not less than 2 mm. A corner portion having a radius of curvature less than 2 mm is no more effective than a substantially right-angled corner portion with respect to the effect of preventing an unfilled region from generated.

On the other hand, if a radius of curvature is too large, the size of the pixel region is limited. Therefore, the radius of curvature is in the range that the sealing material does not overlap the pixel region. It does not matter that the sealing material is disposed over the peripheral driver circuit regions. According to the present invention, since the peripheral driver circuit regions are inside the sealing material, the radius of curvature can be large around the peripheral driver circuit regions, and consequently, an unfilled region can be scarcely generated.

According to the structure of the present invention, the time necessary for the process of injecting a liquid crystal material in manufacturing a liquid crystal device can be shortened, and the productivity of a liquid crystal device can be improved.

By applying the present invention to a batch processing and by injecting a liquid crystal material into a plurality of multiple panels simultaneously, the productivity can be further improved.

Further, while the surface of a substrate of a multiple panel is usually made perpendicular when a liquid crystal material is injected, if the multiple panel itself is large, it is sometimes difficult that the liquid crystal comes in to the top. Therefore, the surface of a substrate may slant (the surface of a substrate may have a predetermined elevation angle with respect to a horizontal plane).

Embodiment 1

Figure 2:
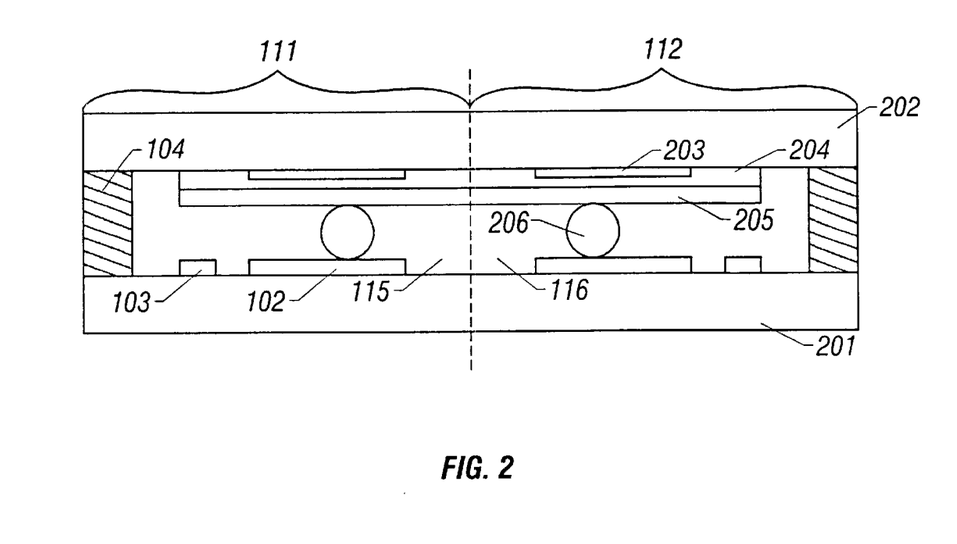
FIG. 2 is a sectional view taken along the line A–A' of FIG. 1.

The present embodiment shows an example of injecting in a single process a liquid crystal material into the whole of a multiple panel manufactured to become four panels. FIG. 2 is a sectional view taken along the line A–A' of FIG. 1.

First, the multiple panel 101 will be described with reference to FIG. 1. The multiple panel 101 shown here is to be the four panels 111–114 which are independent of one another after being separated in a later process. In the multiple panel 101, a pair of substrates are provided so as to face each other interposed the sealing material 104 therebetween.

The sealing material 104 is formed with seal openings 115–118 for injecting the liquid crystal material into the respective panels. The seal openings 115–118 all leads to the injection hole 110 so that the liquid crystal material injected from the injection hole 110 fills the regions inside the seal material 104 of all the panels. In the present embodiment, the injection hole 110 is provided only on one side of the multiple panel 101.

In each of the panels, the pixel region 102 having an active matrix structure and the peripheral driver circuit region 103 for driving the pixel region are disposed in the region inside the seal material 104.

Further, in the present embodiment, as shown in FIG. 1 as B, the corner portions of the sealing material 104 have a radius of curvature of 3 mm to prevent from generating a region unfilled with the liquid crystal material which is liable to appear in a corner portion.

Here, the structure of the panel will be described in detail with reference to FIG. 2. As shown in FIG. 2, in the multiple panel 101, an element substrate 201 and a counter substrate 202 are formed so as to face each other interposed the sealing material 104 therebetween. The size of the counter substrate 202 is substantially the same as that of the element substrate 201. Here, the sizes of the element substrate 201 and of the counter substrate 202 are both 300 mm×300 mm.

The pixel regions 102 and the peripheral driver circuit regions 103 are disposed on the element substrate 201. The pixel region has an active matrix structure in which each of the pixels is connected with a switching element such as a thin film transistor. The peripheral driver circuit regions are provided with a driver circuit for driving the pixel region.

Both of the pixel regions 102 and the peripheral driver circuit regions 103 have thin film transistors directly provided on the element substrate 201 formed of glass. The thin film transistors constituting the pixel regions are thin film transistors formed of amorphous silicon or polysilicon. The thin film transistors forming the peripheral driver circuit regions are required to be operated at a high speed, and thus, are thin film transistor formed of polysilicon.

Further, color filters 203, polarization layer 204, and counter electrodes 205 are formed on the counter substrate 202. Orienting films which are not shown are provided on the surface of the respective substrates.

In FIG. 2, spacers 206 are dispersed between the element substrate 201 and the counter substrate 202 to maintain the space between the substrates. Further, the size of the counter substrate 202 is the same as that of the element substrate 201 both of which substrates form the multiple panel 101.

In each of the panels, since the pixel region 102 and the peripheral driver circuit regions 103 are disposed inside the sealing material 104, when the liquid crystal material is injected in a later process, the spaces over the pixel region 102 and the peripheral driver circuit regions 103 are filled with the liquid crystal material.

In this way, the peripheral driver circuit regions 103 of the respective panels are provided inside the sealing material 104 of the respective panels. Therefore, the peripheral driver circuit regions 103 of the respective panels may be formed anywhere with respect to the seal openings, as far as they are formed on the periphery of the pixel regions 102.

In other words, the position of the seal openings 115–118 and the injection hole 110 is completely independent of the position of the peripheral driver circuit regions 103 of the respective panels. This is an important point of the whole invention disclosed in the present specification.

According to a conventionally general structure in which the sealing material 104 surrounds only the pixel regions 102 and the peripheral driver circuit regions are formed outside the sealing material 104, the seal openings can not be formed on the side of the peripheral driver circuit regions of the sealing material surrounding the pixel regions. Thus, the degree of freedom in forming the injection hole and the seal openings is considerably limited.

By the way, in FIG. 1, the sealing material between a panel and another panel adjacent to the panel is formed so as to be twice as wide as other portions of the sealing material. This is because the sealing material 104 shown in FIG. 1 is formed so as to be one-line sealing between a panel and another panel adjacent to the panel. Widening the sealing material of that portion assures sealing after the multiple panel is parted into panels.

On the other hand, alternatively, the sealing material for surrounding the pixel regions and the peripheral driver circuit regions may be formed independently with regard to the respective panels. In other words, two lines of the sealing material adjacent to each other may exist between a panel and another panel adjacent to the panel.

In some cases, the latter arrangement is more preferable taking in consideration a later process of separating with a scriber or a breaker. In this case, the space between the two lines of the sealing material is preferably not less than 100 μm, and the portion between the two lines of the sealing material is separated with, for example, a scriber.

A single or a plurality of the injection holes 110 for the liquid crystal material are provided at a peripheral portion of the multiple panel 101.

With a multiple panel structured in this way, the liquid crystal material can be injected into a plurality of panels in a single injecting process, and thus, the time necessary for manufacturing the panels can be shortened.

Embodiment 2

The present embodiment shows a process of injecting the liquid crystal material into the multiple panel shown in Embodiment 1. The present embodiment is described with reference to FIG. 1.

First, the multiple panel 101 is disposed inside the vacuum chamber 121. In FIG. 1, the panel 101 is supported by a holder which is not shown. Here, the surface of the substrate is perpendicularly disposed so that the injection hole 110 comes to the bottom. If it is difficult to inject into the multiple panel due to its large size, the surface of the substrate may be slanted.

In order to improve the productivity, a plurality of panels may be disposed inside the vacuum chamber 121 at a time.

The vacuum chamber 121 has an evacuation pipe 123 connected therewith through a valve 122. The evacuation pipe 123 is connected with a vacuum pump which is not shown to enable the pressure inside the vacuum chamber 121 to be reduced.

Further, a liquid crystal vessel 125 containing the liquid crystal material 124 is disposed on a stage 126. The stage 126 is vertically movable. As the liquid crystal material 124, various kinds of liquid crystal materials such as nematic, smectic, or cholesteric one can be used. Here, nematic liquid crystal is used.

After the multiple panel 101 is disposed, the air inside the vacuum chamber 121 is evacuated from the evacuation pipe 123 so that the pressure inside the vacuum chamber 121 is reduced to be on the order of $1\times10^{-5}$ Torr.

Next, the stage 126 is moved up to soak the injection hole 110 in the liquid crystal material 124 in the liquid crystal vessel 125. Here, both of the liquid crystal vessel 125 and the panel 101 may be heated to enhance the flowability of the liquid crystal material 124. This makes the liquid crystal material to come in the panel more easily to further shorten the time necessary for the injecting process.

With this state being maintained, the pressure inside the vacuum chamber 121 is gradually raised. Then, due to the difference in pressure and a capillarity, as shown by an arrow in FIG. 1, the liquid crystal material 124 is injected from the injection hole 110 of the multiple panel through the seal openings 115–118 of the respective panels into the inside of the sealing material of the respective panels.

Thus, the spaces over the pixel regions 102 and the peripheral driver circuit regions 103 forming the respective panels are filled with the liquid crystal material 124. In other words, after the liquid crystal material is injected, the pixel regions and the peripheral driver circuit regions are in contact with the liquid crystal material 124.

Next, the valve 122 is released to terminate the state of the reduced pressure, and the multiple panel 101 with the liquid crystal material 124 injected therein is taken out from the vacuum chamber 121.

Then, the multiple panel 101 is separated into the individual panels 111–114. The separation is carried out with a scriber or a dicing saw.

In case a scriber is used, grooves defining the individual panels are cut in one of the glass substrates, and a breaker is used and a cylindrical material made of urethane is dropped with pressure caused by an air cylinder from right above the grooves in the substrate to part the multiple panel into the individual panels.

Next, the injection hole is sealed. With respect to each of the separated respective panels, both sides of the substrates are evenly pressurized to make even the space between the substrates and to extrude excess liquid crystal. With the state maintained, ultraviolet curing or heat curing resin for sealing is applied to the injection hole. When the pressurization is removed, the resin comes a little in the inside of the injection hole. With the state maintained, ultraviolet is irradiated or heating is carried out to seal the injection hole. This process is carried out with respect to each of the panels.

After that, polarizing plates are located to both of the surfaces of the panel, wiring for electric connection with the external is connected, and a liquid crystal device is completed.

In this way, the liquid crystal material can be injected into and can fill four panels in a single process of injecting the liquid crystal material.

According to the process shown in the present embodiment, the time necessary for injecting the liquid crystal material per panel is shorten by 10 to more than 30 minutes compared with the case in which the liquid crystal material is injected into the individual panels one by one.

Embodiment 3

In the present embodiment, an example is shown in which injection holes and inflow paths for the liquid crystal material are formed on both sides of a multiple panel.

Figure 3:
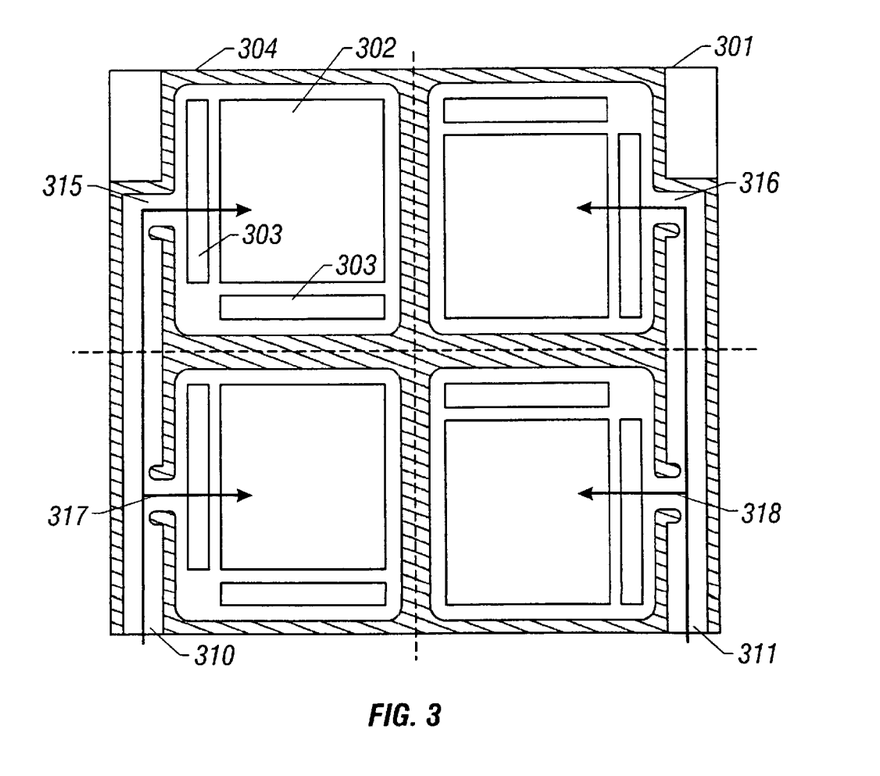
FIG. 3 shows the structure of a multiple panel used in Embodiment 3.

FIG. 3 shows the structure of a multiple panel used in the present embodiment. In a multiple panel 301 shown in FIG. 3, seal openings 315 and 316 of the left panels in FIG. 3 lead to an injection hole 310. Seal openings 317 and 318 of the right panels lead to an injection hole 311. The injection holes 310 and 311 are provided on a side among the peripheral portion of the panel 301.

Further, in FIG. 3, similarly to FIG. 1, the sealing material between a panel and another panel adjacent to the panel is disposed so as to be twice as wide as other portions of the sealing material. Of course, the sealing material for surrounding the pixel regions and the peripheral driver circuit regions may be disposed independently with regard to the respective panels.

In such a structure, seal openings for the respective panels do not exist in the places where the multiple panel is to be separated into the individual panels. In other words, the places where the multiple panel is to be separated into the individual panels are far from the seal openings. Therefore, the possibility that fine powder such as of glass, which is liable to be generated in a separation process with a scriber or a dicing saw, flows in the seal openings can be reduced. Thus, the deterioration of reliability of a manufactured liquid crystal device can be prevented.

In the panel shown in FIG. 3, similarly to the one shown in FIG. 1, a pixel region 302 and peripheral driver circuit regions 303 of each of the panels are disposed inside the sealing material 304. Therefore, when the liquid crystal material is injected, the spaces over the pixel region 302 and the peripheral driver circuit regions 303 are filled with the liquid crystal material.

In each of the panels of the multiple panel 301 shown in FIG. 3, the seal opening is formed on the side of the peripheral driver circuit regions 303. Therefore, the liquid crystal material injected into the panel spreads through the space over the peripheral driver circuit regions 303 to the side of the pixel region 302. Of course, the peripheral driver circuit regions 303 may be formed anywhere as far as they are formed inside the sealing material 304 and on the periphery of the pixel region 302.

In other words, in the present embodiment also, similarly to Embodiment 1, the position of the seal openings 315–318 and the injection holes 310 and 311 is completely independent of the position of the peripheral driver circuit regions of the respective panels. Therefore, the seal openings can be provided on the side of the peripheral driver circuits and the liquid crystal material can be injected therefrom. Thus, the degree of freedom in forming the injection holes and the seal openings is quite high.

The process of injecting the liquid crystal material into the multiple panel shown in FIG. 3 is conducted inside a vacuum chamber according to the process described in Embodiment 2. The liquid crystal material is injected through the paths shown by arrows in FIG. 3 into the respective panels.

A sealing process after the liquid crystal material is injected into the multiple panel 301 and the multiple panel 301 is taken out from the vacuum chamber is hereinafter described.

First, both sides of the substrates of the multiple panel 301 are pressurized to extrude excess liquid crystal from the injection holes 310 and 311. Next, with the pressurization maintained, ultraviolet curing or heat curing resin for sealing is applied so as to seal the injection holes 310 and 311, and then, the pressurization is removed and the resin for sealing comes a little in the inside of the injection holes 310 and 311. With the state maintained, ultraviolet is radiated or heating is carried out to cure the resin for sealing.

Next, the multiple panel is separated into the individual panels with a scriber or a dicing saw at places to be separated shown by dotted lines.

Then, both sides of the substrates of the individual panels are pressurized to extrude excess liquid crystal from the portions of the separated face leading to the sealing openings. With the state maintained, ultraviolet curing or heat curing resin for sealing is applied to the portions of the separated face leading to the sealing openings. Then, the pressurization is removed to let the resin for sealing come a little in the inside of the panels. After that, ultraviolet is irradiated or heating is carried out to cure the resin for sealing and to carry out the sealing.

Alternatively, the portions near the seal openings of the respective panels may be separated once more and the seal openings or portions near the seal openings may be sealed. This process may be performed before, or alternatively, may be after the process of separating the multiple panel into the individual panels. It is to be noted, however, that, since the places where the multiple panel is separated into the individual panels are near the seal openings, compared with the above-mentioned method, the possibility that particulates and impurities generated in the separating are contaminated into the liquid crystal material is increased.

Embodiment 4

The present embodiment relates to a process of manufacturing a multiple panel having peripheral driver circuit regions and a pixel region inside a sealing material.

FIGS. 4A–4E show a process of manufacturing an element substrate. The left side of FIGS. 4A–4E show a process of manufacturing a thin film transistor of peripheral driver circuit while the right side of FIGS. 4A–4E show a process of manufacturing a thin film transistor of an active matrix circuit. FIGS. 4A–4E show the pixel region and the peripheral driver circuit region for one panel. Therefore, in practice, a plurality, for example, four, of the same structure are formed on the substrate.

Figure 4A:
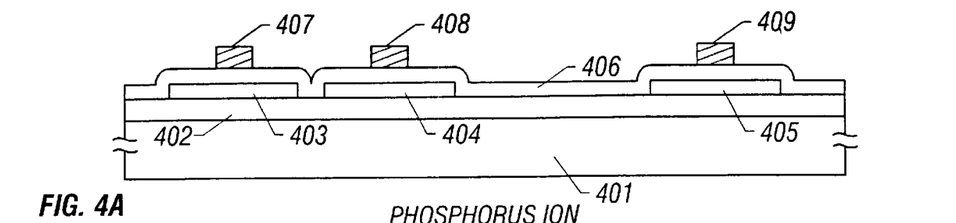
FIGS. 4A–4E show a process of manufacturing an element substrate.

First, a silicon oxide film is formed at a thickness of 1,000–3,000 Å as a base oxide film 402. The silicon oxide film may be formed by sputtering or plasma CVD in an oxygen atmosphere.

Next, an amorphous or polycrystalline silicon film is formed by plasma CVD or LPCVD at a thickness of 300–1,500 Å, preferably 500–1,000 Å. Then, thermal annealing is carried out at not less than 500° C., preferably 800–950° C., to crystallize the silicon film. Photo annealing may be carried out after the crystallization by thermal annealing to increase the crystallinity of the silicon film. Further, in the crystallization by thermal annealing, as disclosed in Japanese Patent Laid-open Application Nos. Hei 6-244103 and Hei 6-244104, an element such as nickel for promoting the crystallization of silicon (catalytic element) may be added.

Next, the silicon film is etched to form island-like active layers 403 and 404 of the thin film transistor of the peripheral driver circuits and to form an active layer 405 of the thin film transistor of the matrix circuit (pixel thin film transistor). The active layer 403 forms a p-channel thin film transistor while the active layer 404 forms an n-channel thin film transistor.

Further, a gate insulating film 406 of silicon oxide is formed at a thickness of 500–2,000 Å by sputtering in an oxygen atmosphere. The gate insulating film 406 may alternatively be formed by plasma CVD. In case the silicon oxide film is formed by plasma CVD, it is preferable that dinitrogen monoxide ($N_2O$), or oxygen ($O_2$) and monosilane ($SiH_4$) are used as the material gas.

Thereafter, a polycrystalline silicon film (with a trace of phosphorus contained for enhancing conductivity) is formed by LPCVD on the entire surface of the substrate at a thickness of 2,000 Å to 5 μm, preferably 2,000–6,000 Å. Then, this is etched to form gate electrodes 407, 408, and 409 (FIG. 4A).

Figure 4B:
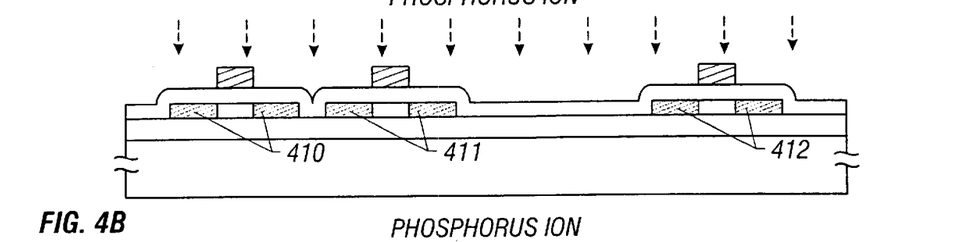

Then, phosphorus is implanted to all of the island-like active layers 403, 404, and 405 using the gate electrodes 407, 408, and 409 as masks and phosphine ($PH_3$) as the doping gas in a self-aligning manner. The dopant dose is $1\times10^{12}$–$5\times10^{13}$ atom/cm$^2$. As a result, weak n-type regions 410, 411, and 412 are formed (FIG. 4B).

Figure 4C:
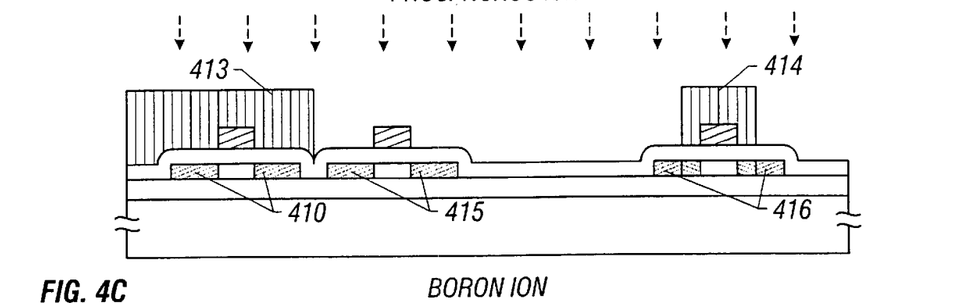

Next, a photoresist mask 413 covering the active layer 403 of the p-channel thin film transistor, and a photoresist mask 414 covering the portion up to 3μm away from an edge of the gate electrode 409 in parallel with the gate electrode 409 of the active layer 405 of the pixel thin film transistor are formed. Then, phosphorus is again implanted to the active layers 404 and 405 by ion doping with phosphine being as the doping gas. The dopant dose is $1\times10^{14}$–$5\times10^{15}$ atom/cm$^2$. As a result, strong n-type regions (source/drain) 415 and 416 are formed. In this doping, phosphorus is not implanted to a region 417 covered with the mask 414 of the weak n-type region 412 of the active layer 405 of the pixel thin film transistor, and thus, the region 417 remains the weak n-type (FIG. 4C).

Figure 4D:
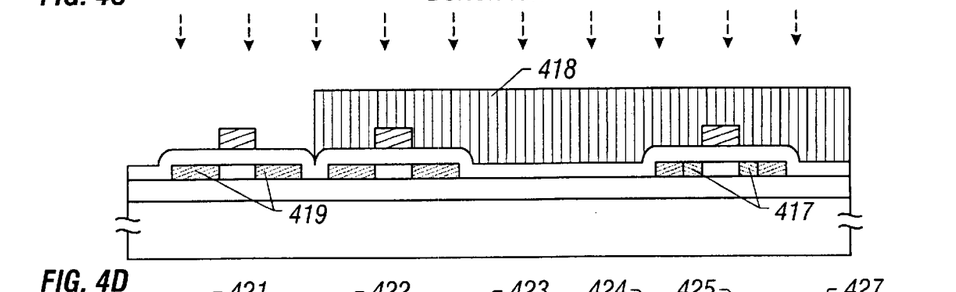

Next, the active layers 404 and 405 of the n-channel thin film transistor are covered with a photoresist mask 418, and boron is implanted by ion doping into the active layer 403 using diborane ($B_2H_6$) as the doping gas. The doze is $5\times10^{14}$–$8\times10^{15}$ atom/cm$^2$. In this doping, since the doze of boron exceeds the doze of phosphorus in FIG. 4C, the weak n-type region 410 formed earlier is reversed to a strong p-type region 419. By the above doping, the strong n-type regions (source/drain) 415 and 416, a strong p-type region (source/drain) 419, and the weak n-type region (low-concentration impurity region) 417 are formed. In the present embodiment, the width x of the low-concentration impurity region 417 is about 3 μm (FIG. 4D).

Thereafter, by carrying out thermal annealing at 450–850° C. for 0.5–3 hours, damage due to the doping is recovered, the doping impurity is activated, and the crystallinity of the silicon is recovered. After that, a silicon oxide film is formed by plasma CVD on the entire surface at a thickness of 3,000–6,000 Å as an interlayer insulator 420. The interlayer insulator 420 may be a silicon nitride film, or a multilayer film of a silicon oxide film and a silicon nitride film. Then, the interlayer insulator 420 is etched by wet etching to form contact holes at the source/drain.

Figure 4E:
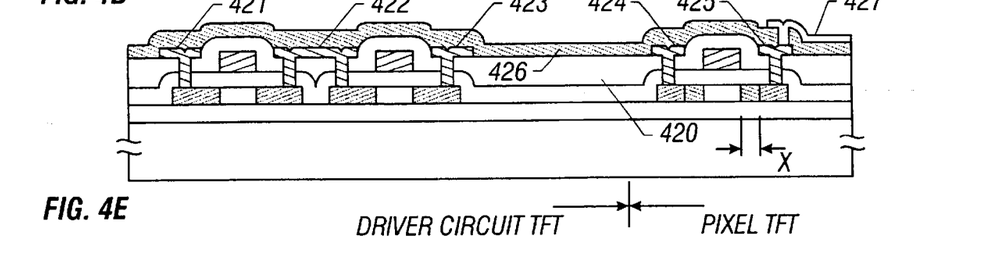

Then, titanium film at a thickness of 2,000–6,000 Å is formed by sputtering, and is etched to form electrodes and wirings 421, 422, 423 of the peripheral circuits and electrodes and wirings 424 and 425 of the pixel thin film transistor. Further, a silicon nitride film 426 is formed by plasma CVD at a thickness of 1,000–3,000 Å as a passivation film, and is etched to form a contact hole reaching the electrode 425 of the pixel thin film transistor. Finally, an ITO (indium tin oxide) film formed by sputtering at a thickness of 500–1,500 Å is etched to form a pixel electrode 427.

In this way, a plurality of peripheral driver circuit regions and pixel regions formed of active matrix circuits are formed on a single substrate to form an element substrate for a multiple panel (FIG. 4E).

On the other hand, the counter substrate is formed in a known method by layering a color filter, a planarization layer, and a counter electrode on a glass substrate. The size of the glass substrate forming the counter substrate is the same as that of the element substrate. The color filter is provided so as to present three colors, namely, R (red), G (green), and B (blue) corresponding to the respective pixels in the pixel region provided on the element substrate.

Next, a process of fabricating the multiple panel is described in the following. First, in order to stick orienting films on the element substrate and the counter substrate, known polyimide varnish is printed on both of the substrates with a flexographic press.

Then, the element substrate and the counter substrate are heated and cured. Next, a rubbing process is carried out where the surfaces of the respective substrates with an orienting film sticked thereon are unidirectionally rubbed by a buffing cloth (fiber such as rayon and nylon) the staple length of which is 2–3 mm to make minute grooves.

Then, spherical spacers such as of polymer system, glass system and silica system are dispersed on either the element substrate or the counter substrate. As the method of dispersing the spacers, there are a wet method in which the spacers are mixed with solvent such as pure water and alcohol and are dispersed on the glass substrate, and a dry method in which the spacers are dispersed without the help of any solvent.

Next, the sealing material is formed on the outer peripheral portion of faces which are to become inside walls of the element substrate or the counter substrate. As the sealing material, epoxy resin and phenol curing agent dissolved in ethyl cellulose solvent is used. The sealing material is formed on the substrate by screen printing or dispenser method.

After the sealing material is formed, the two glass substrates are laminated. This is carried out by heat curing in which the sealing material is cured in about three hours by high-temperature press.

In this way, the multiple panel is manufactured.

According to the present invention, the time necessary for a process of injecting a liquid crystal material by vacuum injection can be greatly shortened.

What is claimed is:

1. A method of manufacturing an active matrix type display device comprising the steps of:
    preparing a first substrate for forming at least first and second panels, said first substrate having thereon a first active matrix circuit and a first peripheral circuit for the first panel and a second active matrix circuit and a second peripheral circuit for the second panel;
    joining a second substrate with the first substrate through a sealing member therebetween so that at least first and second spaces are defined by the sealing member in correspondence to the first and second panels, respectively;
    wherein the sealing member is provided with first and second openings corresponding to the first and second panels, respectively and at least one common injection hole;
    injecting a liquid crystal material into the first and second spaces from the common injection hole through the first and second openings, respectively;
    separating the first and second substrates into the first and second panels,
    wherein the sealing member surrounds at least the first active matrix circuit and the first peripheral circuit for the first panel and the second active matrix circuit and the second peripheral circuit for the second panel.

2. A method according to claim 1, wherein the liquid crystal material is injected by a vacuum injection method.

3. A method according to claim 1, wherein the first and second openings are located adjacent with each other and the common injection hole is located between the first and second panels.

4. A method according to claim 1, wherein the first and second openings are located along an edge of the first and second substrates.

5. A method according to claim 1, wherein each of the first active matrix circuit and the second active matrix circuit comprises at least a first thin film transistor as a switching element.

6. A method according to claim 5, wherein the first thin film transistor includes amorphous silicon.

7. A method according to claim 5, wherein the first thin film transistor includes polysilicon.

8. A method according to claim 1, wherein each of the first peripheral circuit and the second peripheral circuit comprises at least a second thin film transistor.

9. A method according to claim 8, wherein the second thin film transistor includes polysilicon.

10. A method according to claim 1, wherein at least a color filter, a planarization layer and at least a counter electrode are formed over the second substrate.

11. A method according to claim 1, wherein the sealing material is cured by a heat curing.

12. A method for manufacturing an active matrix type display device comprising the steps of:
    preparing a first substrate for forming at least first and second panels, said first substrate having thereon a first active matrix circuit and a first peripheral circuit for the first panel and a second active matrix circuit and a second peripheral circuit for the second panel;
    joining a second substrate with the first substrate through a sealing member which is formed in a sealing region between the first and second substrates so that at least first and second spaces are defined by the sealing member in corresponding to the first and second panels, respectively;
    wherein the sealing member is provided with first and second openings corresponding to the first and second panels, respectively and at least one common injection hole;
    injecting a liquid crystal material into the first and second spaces from the common injection hole through the first and second openings, respectively;
    separating a portion of the first and second substrates into the first and second liquid crystal panels,
    wherein the sealing member surrounds at least the first active matrix circuit and the first peripheral circuit for the first panel and the second active matrix circuit and the second peripheral circuit for the second panel,
    wherein the separated portion is over the sealing region.

13. A method according to claim 12, wherein the liquid crystal material is injected by a vacuum injection method.

14. A method according to claim 12, wherein the first and second openings are located adjacent with each other and the common injection hole is located between the first and second panels.

15. A method according to claim 12, wherein the first and second openings are located along an edge of the first and second substrates.

16. A method according to claim 12, wherein each of the first active matrix circuit and the second active matrix circuit comprises at least a first thin film transistor as a switching element.

17. A method according to claim 16, wherein the first thin film transistor includes amorphous silicon.

18. A method according to claim 16, wherein the first thin film transistor includes polysilicon.

19. A method according to claim 12, wherein each of the first peripheral circuit and the second peripheral circuit comprises at least a second thin film transistor.

20. A method according to claim 19, wherein the second thin film transistor includes polysilicon.

21. A method according to claim 12, wherein at least a color filter, a planarization layer and at least a counter electrode are formed over the second substrate.

22. A method according to claim 12, wherein the sealing material is cured by a heat curing.

23. A method of manufacturing an active matrix type display device comprising the steps of:

preparing a first substrate for forming at least first and second panels;

forming a first active matrix circuit and a first peripheral circuit for the first panel and a second active matrix circuit and a second peripheral circuit for the second panel on the first substrate;

disposing a sealing member on the first substrate to define at least first and second regions on the first substrate, said first and second regions corresponding the first and second panels, respectively;

mating a second substrate to the first substrate with the sealing member therebetween;

wherein the sealing member is provided with first and second openings corresponding to the first and second panels, respectively and at least one common injection hole;

injecting a liquid crystal material into the first and second regions from the common injection hole through the first and second openings, respectively;

cutting the first and second substrates into at least the first and second panels along a cutting line between the first and second regions, wherein the cutting line is overlapped with a portion of the sealing member.

24. A method according to claim 23, wherein the liquid crystal material is injected by a vacuum injection method.

25. A method according to claim 23, wherein the first and second openings are located adjacent with each other and the common injection hole is located between the first and second panels.

26. A method according to claim 23, wherein the first and second openings are located along an edge of the first and second substrates.

27. A method according to claim 23, wherein each of the first active matrix circuit and the second active matrix circuit comprises at least a first thin film transistor as a switching element.

28. A method according to claim 27, wherein the first thin film transistor includes amorphous silicon.

29. A method according to claim 27, wherein the first thin film transistor includes polysilicon.

30. A method according to claim 23, wherein each of the first peripheral circuit and the second peripheral circuit comprises at least a second thin film transistor.

31. A method according to claim 30, wherein the second thin film transistor includes polysilicon.

32. A method according to claim 23, wherein at least a color filter, a planarization layer and at least a counter electrode are formed over the second substrate.

33. A method according to claim 23, wherein the sealing material is cured by a heat curing.

* * * * *